United States Patent
Grossmann et al.

(10) Patent No.: US 6,318,418 B1
(45) Date of Patent: Nov. 20, 2001

(54) METERING APPARATUS FOR POURABLE BULK MATERIAL

(75) Inventors: Guenter Grossmann, Stuttgart; Anton Ettenhofer, Berglen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,725

(22) PCT Filed: Dec. 7, 1998

(86) PCT No.: PCT/DE98/03578

§ 371 Date: Aug. 7, 2000

§ 102(e) Date: Aug. 7, 2000

(87) PCT Pub. No.: WO99/41148

PCT Pub. Date: Aug. 19, 1999

(30) Foreign Application Priority Data

Feb. 11, 1998 (DE) ................................ 198 05 437

(51) Int. Cl.$^7$ ................ B65B 1/16; B65B 1/36; B65G 53/08
(52) U.S. Cl. ................... 141/59; 141/44; 141/46; 141/65; 141/286; 222/53; 222/152; 222/226
(58) Field of Search ................... 141/44, 46, 47, 141/49, 59, 65, 66, 286; 222/53, 152, 226

(56) References Cited

U.S. PATENT DOCUMENTS

| 2,879,809 | * | 3/1959 | Vogt | 141/286 |
| 3,788,368 | * | 1/1974 | Geng et al. | 141/286 |
| 4,974,646 | * | 12/1990 | Martin et al. | 141/46 |
| 4,976,296 | * | 12/1990 | Pope | 141/46 |
| 6,021,821 | * | 2/2000 | Wegman | 141/65 |
| 6,024,141 | * | 2/2000 | Wegman | 141/59 |
| 6,102,088 | * | 8/2000 | Wegman | 141/286 |

* cited by examiner

Primary Examiner—J. Casimer Jacyna
(74) Attorney, Agent, or Firm—Ronald E. Greigg

(57) ABSTRACT

A worm metering apparatus which includes a metering tube having an end, the end has an annular barrier element, made of sintered metal, that communicates with a negative-pressure source and an overpressure source gas source. A pressure meter is also provided, which measures the negative pressure that prevails in a line to the barrier element. To prevent the barrier element from becoming clogged with bulk material particles, the overpressure gas is conducted to the barrier element during the operation of the worm metering apparatus, in order to detach adhering particles of bulk material.

3 Claims, 1 Drawing Sheet

METERING APPARATUS FOR POURABLE BULK MATERIAL

PRIOR ART

The invention relates to a metering apparatus for pourable bulk material, of the kind known for instance from German Patent Disclosure DE 39 15 144A1. The known metering apparatus, embodied as a worm metering apparatus, has an annular barrier element, preferably of sintered metal, on its metering tube end; via a line, the barrier element communicates with a negative-pressure source. Downstream of the metering end, the ring element is subjected to negative pressure, causing air located in the admission cross section of the ring element to be aspirated away. As a result, the metering tube in the region of the ring element becomes clogged with product material, so that product material is no longer dispensed from the metering tube any longer, for instance into a packaging container. The known metering apparatus has the disadvantage that over the course of successive metering operations, the pores of the gas-permeable ring element become plugged with product particles, thus impairing its function.

An object of the invention is therefore to refine the know metering apparatus for pourable bulk material in such a way that a function of the metering apparatus is always assured over a high number of metering operations. This object is attained with the characteristics of the body of claim 1.

Further advantages and advantageous refinements of the metering apparatus of the invention for pourable bulk material will become apparent from the description set forth herein.

BRIEF DESCRIPTION OF THE DRAWINGS

An exemplary embodiment of the invention is shown in the drawing and will be described in further detail below.

DETAILED DESCRIPTION

Figure 1:
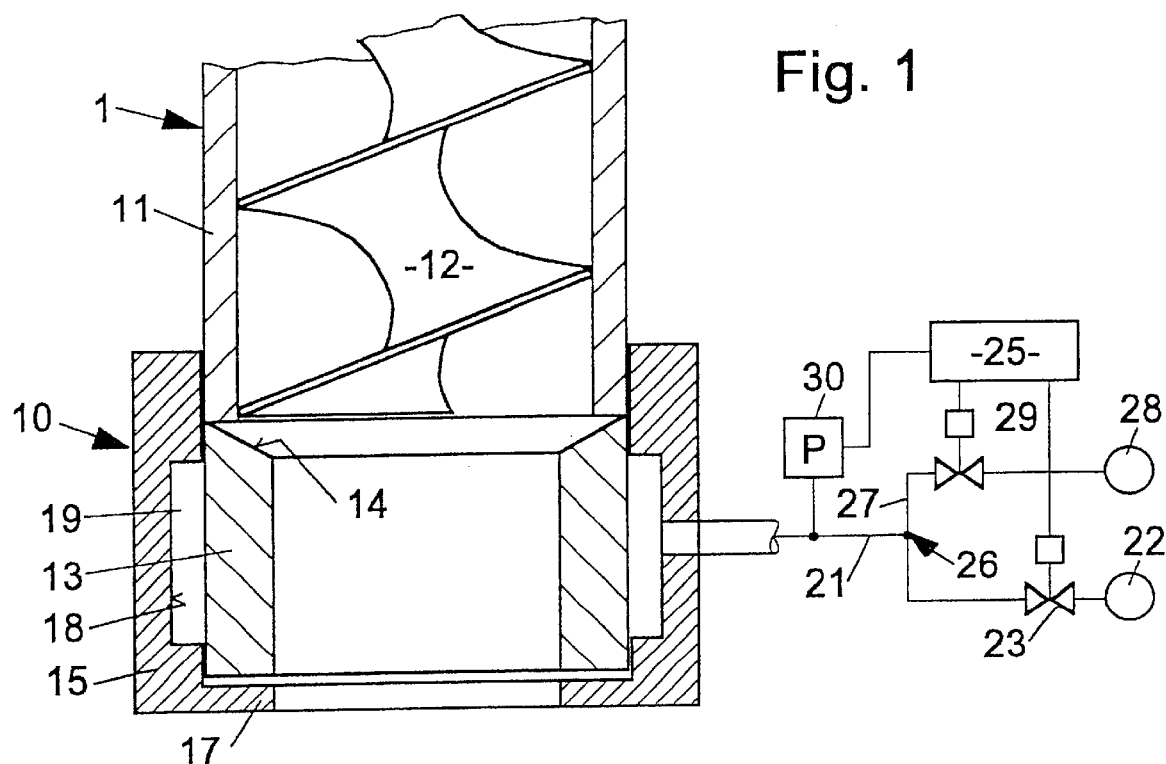
FIG. 1 shows part of a metering apparatus, partly in longitudinal section and partly schematically.

In FIG. 1, the metering tube end 10 of a worm metering apparatus 1 is shown, which in a known manner, by the rotation about a certain angular amount of a metering worm 12 disposed in the metering tube 11 dispenses pourable bulk material, such as coffee, flour, and so forth, into packaging containers placed in readiness below the metering tube end 10. To prevent the bulk material from continuing to trickle after the end of the rotation of the metering worm 12, an annular barrier element 13 below the metering worm 12 communicates with the substantially vertically disposed metering tube 11. The barrier element 13 comprises a gas-permeable material, preferably sintered metal. on the side toward the metering worm 12, the barrier element 13, at its region of transition to the metering tube 11, has an encompassing chamfer 14 on the inside. As a consequence, the inside diameter of the barrier element 13 is somewhat less than the inside diameter of the metering tube 11. The barrier element 13 is secured to the metering tube end 10 by means of a bushlike housing 15. The housing 15, whose inside wall surrounds the metering tube end 10 and at least partly surrounds the barrier element 13 on its outer circumference, has a shoulder region 17 of narrowed inside diameter on its end opposite the metering tube end 10. The region 17 has an inside diameter that corresponds approximately to the inside diameter of the barrier element 13; the face end of the barrier element 13 oriented toward the shoulder region 17 rests against the region 17, so that the barrier element 13 is axially fixed by the region 17.

In the middle portion of the housing 15, an encompassing annular groove 18 is formed, forming a chamber 19 that communicates with a negative-pressure source 22 by means of a first line 21. For subjecting the chamber 19 to negative pressure, a first barrier valve 23 is disposed in the first line 21; this valve can be triggered by the control device 25 of the worm metering apparatus 1. A branch 26 is disposed in the first line 21, upstream of the first barrier valve 23, and a second line 27 originates at this branch and communicates with an overpressure source and/or protective gas source 28. A second barrier valve 29, which is likewise triggerable by the control device 25, is connected between the branch 26 and the overpressure source and/or protective gas source 28. A pressure meter 30 is also interposed in the first line 21 between the housing 15 and the branch 26, and values of pressure meter are delivered as input values to the control device 25.

To describe the mode of operation of the worm metering apparatus 1 of the invention, FIGS. 2a through 2e will now be described.

Figure 2:
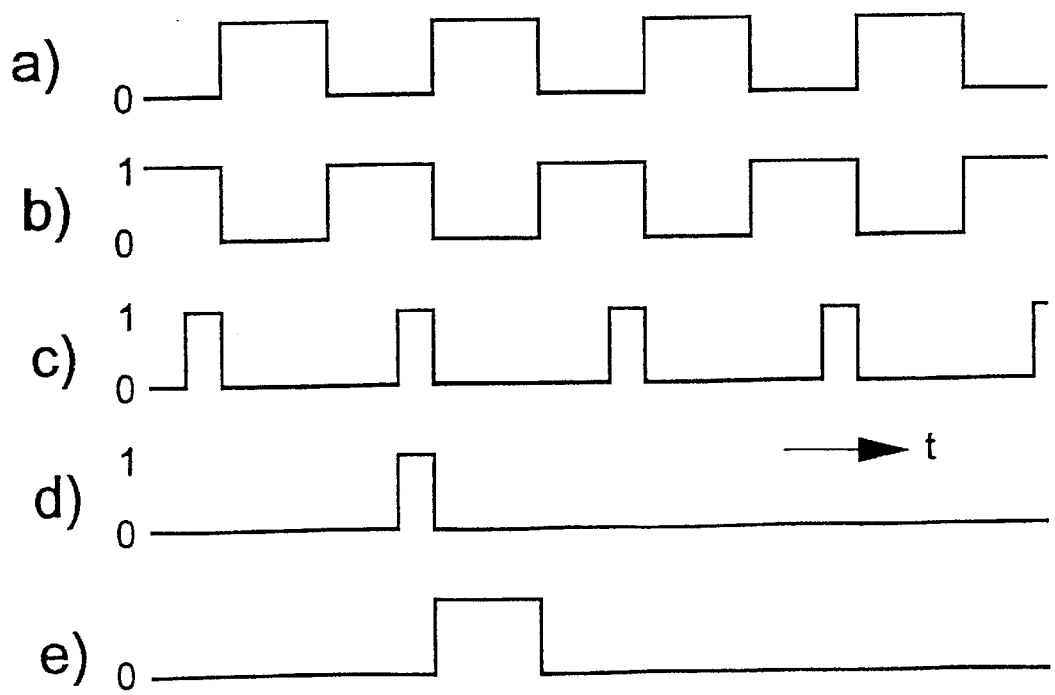
FIGS. 2a through 2e are flow charts for various functions of the metering apparatus over time, in a simplified description.

FIG. 2a shows the intermittent operation of the metering worm 12 over time; in each of the operating phases, a certain quantity of bulk material is dispensed. The first barrier valve 23 is opened (FIG. 2b) in-phase with the stopped phases of the metering worm 12, so that the chamber 19 is subjected to negative pressure. In a known manner, the effect of this is that the air is aspirated out of the open region of the barrier element 13 for the bulk material, through the pores of the barrier element 13, so that bulk material continuing to trickle collects along the inner wall of the barrier element 13 and no longer drops out of the worm metering apparatus 1. At the end of each of the stopped phases of the metering worm 12, or at the end of the phases in which the negative-pressure source 22 is connected through to the chamber 19, the negative pressure prevailing in the first line 21 is detected by the pressure meter 30 and supplied (FIG. 2c) as an input variable to the control device 25. A limit value for a negative pressure is stored in memory in the control device 25; this is the maximum value that can be allowed to be attained if the barrier element 13 is to function properly. Since depending on the type of bulk material, the pores of the barrier element 13 become more or less clogged on the inside remote from the chamber 19 during the stopped phases of the metering worm 12, the result sooner or later is that the barrier element 13 becomes less and less gas-permeable, and the negative pressure can no longer act on bulk material that continues to trickle in. This clogging of the pores of the barrier element 13 has the effect that gradually, a greater negative pressure is measured in the first line 21. FIG. 2d shows that during a measurement of the negative pressure, the limit value stored in memory in the control device 25 is reached. As a result, as shown in FIG. 2e, in the ensuing operating phase of the metering worm 12, the second barrier valve 29 is opened by the control device 25, so that overpressure is carried to the chamber 19 via the two lines 21, 27. The effect of the overpressure is that particles of bulk material adhering inside the pores of the barrier element 13 are detached from the pores and dispensed together with the bulk material that has just been metered. The application of the positive pressure can be done after the next container to be filled is in place. Therefore, additional material will not be added to the filled container.

The mode of operation described above for the worm metering apparatus 1 can be modified in manifold ways. For instance, it is conceivable to have the cleaning of the barrier element 13 take place not only during a single metering phase but instead during several successive metering phases. To reduce the expense for equipment for the worm metering apparatus 1, it is also conceivable to dispense with the pressure meter 30. In that case, the surge of compressed air can take place either in each metering phase of the worm metering apparatus 1, or after a certain number of metering phases that is dependent on the bulk material.

Cleaning the barrier element 13 by means of overpressure has the advantage that instead of compressed air, a pressurized protective gas can be employed. This variant is used particularly for bulk materials that have a tendency to spoil and are vulnerable to oxygen, such as coffee.

Instead of pneumatic cleaning of the barrier element 13, mechanical cleaning is also conceivable. This then includes a vibrator device, coupled to the barrier element 13, that is triggered in accordance with the above examples, either via the measured values detected by the pressure meter 30 or after a predetermined number of metering operations. The vibrator device also has the effect of loosening adhering bulk material particles in the pores of the barrier element 13, thus assuring proper operation of the worm metering apparatus 1.

In the above exemplary embodiments, the metering apparatus is embodied as a worm metering apparatus 1. The problems of bulk material that continues to trickle in are also known, however, in other metering apparatuses, such as chamber metering apparatuses, so that the cleaning mechanism according to the invention can also be applied to metering apparatuses of the kind in which similar barrier elements are used.

The foregoing relates to a preferred exemplary embodiment of the invention, it being understood that other variants and embodiments thereof are possible within the spirit and scope of the invention, the latter being defined by the appended claims.

What is claimed is:

1. A metering apparatus (1) for pourable bulk material, comprising a substantially vertically disposed metering tube (11) and a valve device for the bulk material, disposed on an end (10) of the metering tube, the valve device comprises a gas-permeable ring element (13) which includes pores that leaves a product admission cross section free and is made to communicate in alternation with a negative-pressure source (22) and an overpressure source (28), each of which are coupled to a control device (25), a dispenser device (12) for the bulk material is disposed inside the metering tube (11), and that a pressure meter (30) is connected into a line (21) which connects the ring element (13) to the negative-pressure source (22) and to the overpressure source (28), the pressure meter is connected to the control device (25) and a measurement of the pressure meter value serves to trigger the overpressure source (28).

2. The metering apparatus of claim 1, in which the dispenser device for the bulk material is embodied as a metering worm (12).

3. A metering apparatus (1) for pourable bulk material, comprising a substantially vertically disposed metering tube (11), having a dispenser device (12) for the bulk material disposed inside the metering tube, a valve device disposed on an end (10) of the metering tube for the bulk material, the valve device comprises a gas-permeable ring element (13) that leaves an admission cross section free and the gas-permeable ring element communicates in alternation with a negative-pressure source (22) and an overpressure source (28), each of which are coupled to a control device (25), in which to block the valve device, the ring element (13) communicates with the negative-pressure source (22), in a line (21), which connects the negative-pressure source (22) to the ring element (13), the negative pressure is measured during the operation of the negative-pressure source (22); that the negative pressure is delivered as an input variable to the control device (25); and that if a limit value fails to be attained, the control device (25) triggers the overpressure source (28) during at least one subsequent metering phase.

* * * * *